May 23, 1944. G. L. PRATT 2,349,675
CHARGE FORMING SYSTEM FOR INTERNAL COMBUSTION
ENGINE WITH REUSE OF EXHAUST GASES
Filed Oct. 13, 1941 3 Sheets-Sheet 1
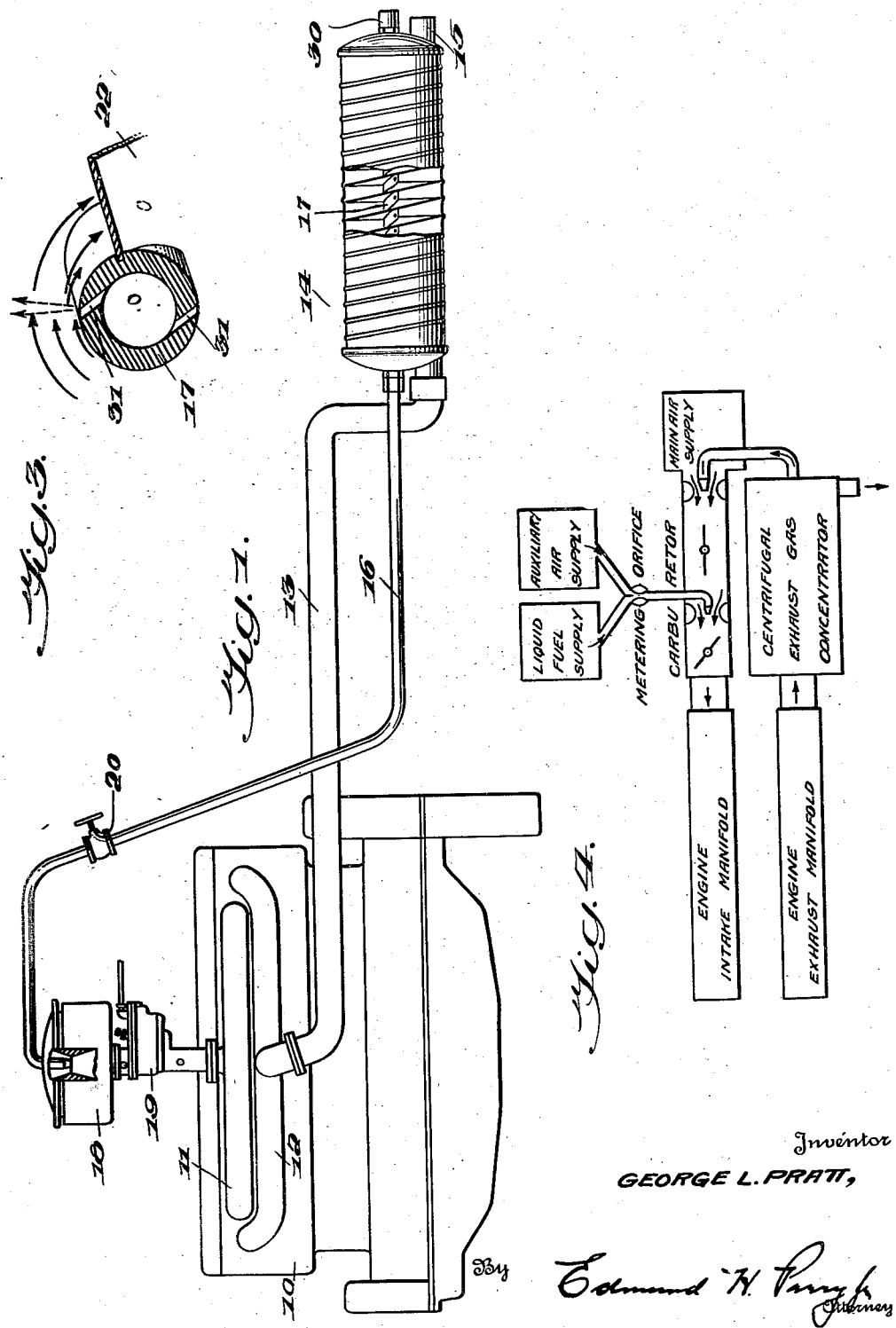
Inventor
GEORGE L. PRATT,

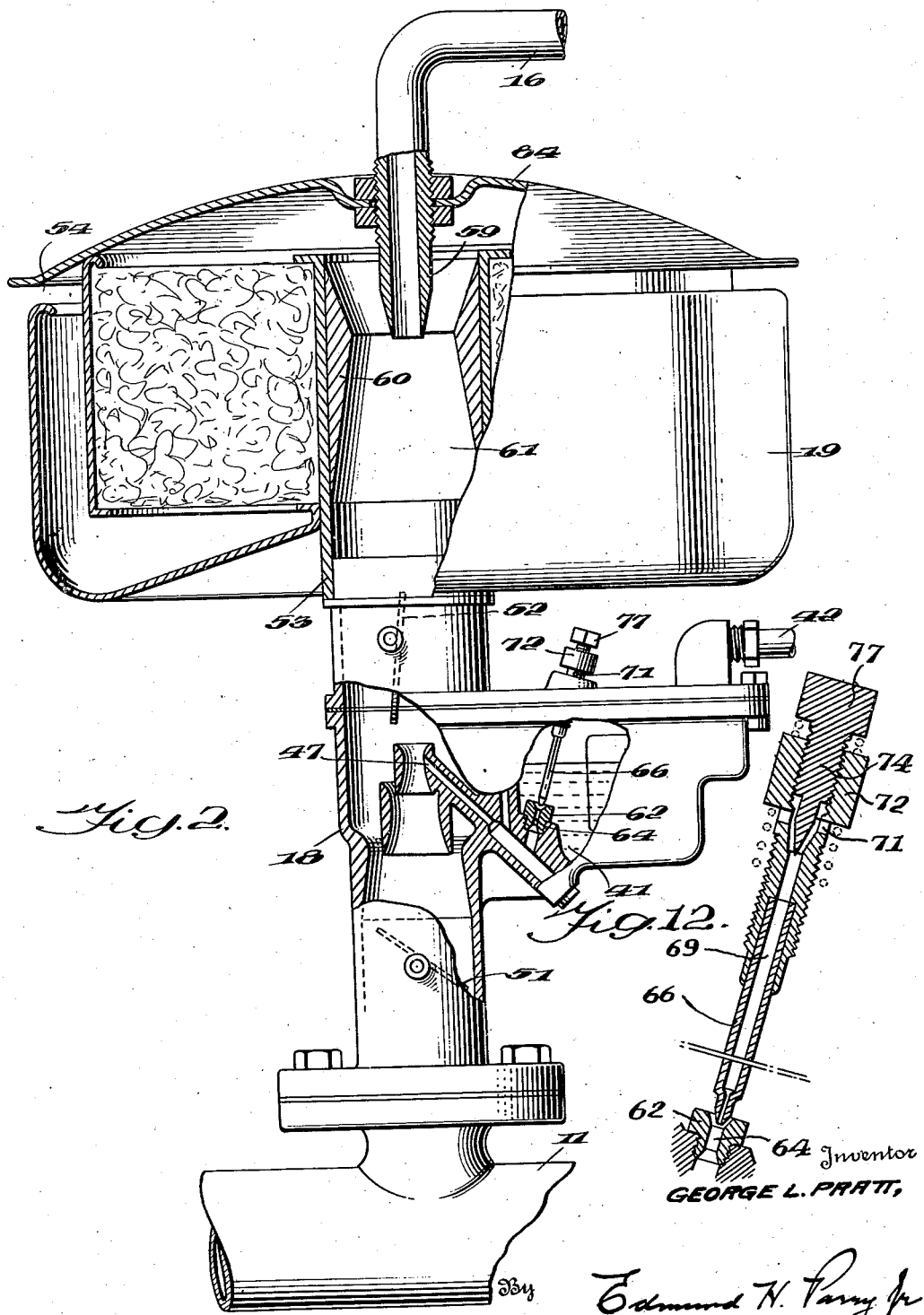

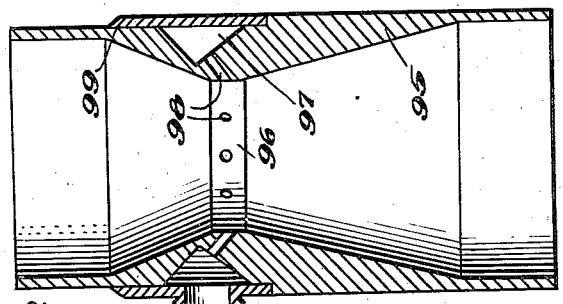
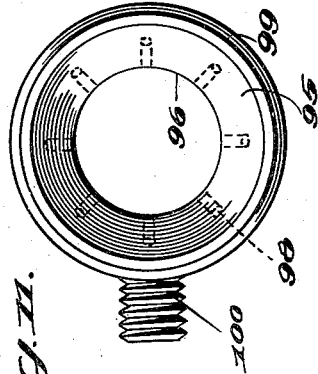
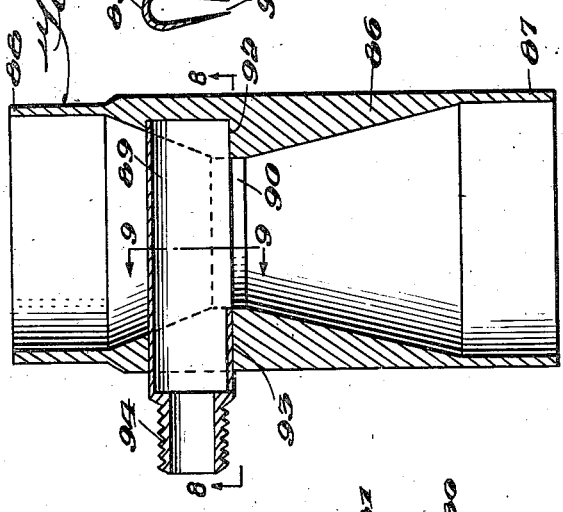
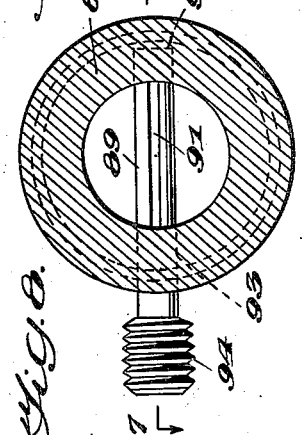
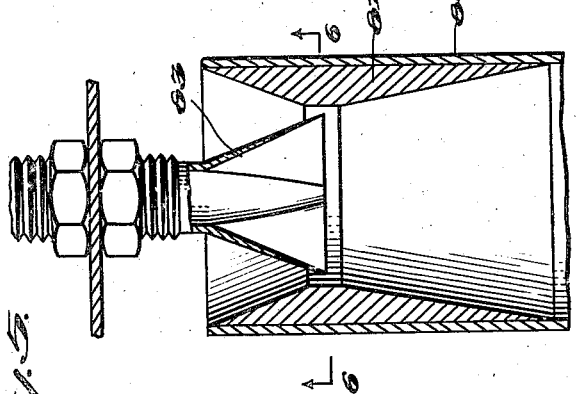
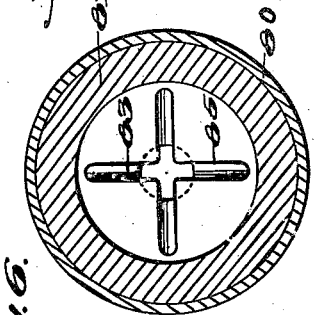
Inventor
GEORGE L. PRATT, Patented May 23, 1944

2,349,675

UNITED STATES PATENT OFFICE 2,349,675

CHARGE FORMING SYSTEM FOR INTERNAL-COMBUSTION ENGINES WITH REUSE OF EXHAUST GASES

George L. Pratt, Atlanta, Ga., assignor to Motor Power, Inc., Atlanta, Ga., a corporation of Georgia Application October 13, 1941, Serial No. 414,870

26 Claims. (Cl. 123—119)

This invention is directed to a charge forming system for internal combustion engines wherein exhaust gases are returned to the engine in substantial quantity and utilized as a combustible, and combustion promoting, component of the operating charge with the gasoline or other fresh fuel, and air components. The general object of the invention is to provide a charge forming system which will insure proper proportioning of the various charge components in relation to each other so as to provide a highly power-producing charge under all conditions of engine speed and load.

In George L. Pratt Patent No. 2,147,670, granted February 21, 1939, is disclosed a system for utilizing exhaust gases as a component of the engine operating charge according to which the exhaust gases are subjected to centrifugal action in a centrifuge disposed in the exhaust line. The centrifugal action tends to remove a portion of the heavier incombustible exhaust components (carbon dioxide and nitrogen), and to produce a refined exhaust gas supply wherein the combustible exhaust components (hydrogen, carbon monoxide and methane) exist in increased proportions sufficient to enable such gases to be utilized in substantial volume as a secondary fuel component of the engine charge. Under the centrifugal action a portion of the water vapor in the exhaust gases formed incident to combustion is eliminated, and another portion of the water vapor is returned to the engine in the refined exhaust gas supply. It has been found that such return of water vapor is beneficial in preventing preignition knock, preventing the building up of carbon deposits in the engine and increasing power production. As is well understood carbon is continually produced in the engine incident to the combustion of a hydrocarbon fuel, and this tends to deposit in solid form. Because of the high temperature existing in the cylinders, it appears that the water vapor prevents or eliminates the deposit of carbon in solid form by reacting therewith to produce combustible carbon monoxide and hydrogen (according to the formula C plus $H_2O$ equals CO plus $H_2$) which may be employed as fuel components in conjunction with the combustibles of the exhaust gases and the fresh fuel in the engine operating charge.

By virtue of the fact, as pointed out in my above patent, that the exhaust gases are combustible, and are returned and utilized in an engine in substantial volume, it is necessary that the proportion thereof be carefully controlled at all times so as to maintain a balanced ratio between such gases and the air and fresh fuel charge components. By reason also of the fact that the gases themselves function as a fuel component the quantity of fresh fuel incorporated in the charge must be substantially less than where the charge is composed solely of fresh fuel and air.

In my original system as disclosed in the aforesaid patent the exhaust gases are withdrawn from the centrifuge in which they are treated under the effective suction of the engine and returned to the intake manifold of the engine for admixture therein with a proper mixture of fresh fuel and air. Provision was made to control the quantity of exhaust gases introduced into the charge by a mechanical valve arrangement in the exhaust gas return line which served to increase and decrease the quantity of exhaust gases returned with variation in the engine demands. While such system works in a fairly satisfactory manner it does not control and maintain the proportions of the charge ingredients in relation to each other as satisfactorily as might be desired under varying conditions of engine speed and load. For example, at low speeds, and particularly at idling speed, the exhaust gases are likely to be supplied in too great quantity in relation to the fresh fuel and air to provide an efficient operating charge, because with the carburetor throttle valve mostly or wholly closed the suction in the carburetor controlling the fresh fuel and air components is less than the suction in the intake manifold acting to draw back the exhaust gases. Again, with such system difficulty has been experienced at high engine speeds in returning the exhaust gases in sufficient quantity in relation to the proportions of fresh fuel and air. This difficulty also has now been traced to the fact that the suction effect of the engine through which the exhaust gases are withdrawn from the centrifuge and taken back to the engine intake varies in relation to the effective suction in the carburetor determined by the throttle valve which governs the proportions of the air and fresh fuel charge components, and to the further fact that the suction in the intake manifold is not sufficiently high to draw the treated exhaust gases back from the centrifuge in sufficient volume in relation to the proportions of the fresh fuel and air.

At high engine speeds also there is an adverse suction effect created by the exhaust gases in the centrifuge during their flow therethrough such as to counteract and reduce, to some extent, the effect of the engine suction in drawing the gases back to the engine, and this also leads to the result that insufficient treated exhaust gases are supplied in relation to the proportions of fresh fuel and air.

A further difficulty has been encountered in the original system employing a carburetor due to the fact that it is necessary to materially restrict the quantity of fresh fuel entering the charge to prevent the charge from being too rich by virtue of the combustible fuel values in the exhaust. The metering orifice which proportions the quantity of fresh fuel entering into the charge when used in the system is required to be so small that it clogs easily with the result that at times the liquid fuel supply tends to vary and in some cases is entirely cut off with the result that the engine becomes erratic in operation and sometimes stops.

The present invention provides an improved charge forming system calculated to overcome the difficulties herein discussed, and tests have demonstrated that the same provides a substantial improvement over the system of the aforesaid Patent No. 2,147,670.

While ordinarily the system will be employed in conjunction with an engine provided with a carburetor as a part of the charge forming system, the improved system does not fundamentally depend on the employment of a carburetor and is adapted to be employed with engines wherein the fresh fuel is supplied either directly to the engine cylinders, or to the engine intake manifold, for admixture with the air to support its combustion.

According to the present invention, arrangement is made whereby the exhaust gases are withdrawn from the centrifuge under the suction of the incoming air charge component preliminary to the admixture of the air with the fresh fuel charge component. As the flow of such air varies, the quantity of exhaust gases returned for use as a charge component will vary. The flow of air may be created through the effective suction of the engine as ordinarily the case, or may be supplied under forced draft independently of the engine suction by means of a suitable blower or super-charger. In either case the use of a control valve in the exhaust return line such as provided in Patent 2,147,670 is dispensed with and the proportion of the exhaust gases entering the charge is regulated automatically and maintained at all times in proper ratio with the incoming air supply. Where a carburetor is employed to supply fresh fuel in a proper state the incoming air with the exhaust gases admixed therewith will enter the carburetor and be admixed therein with the fresh fuel, the point of admixture of exhaust gases with the air being on the air intake side of the carburetor throttle valve so that such valve will serve to control the quantity of exhaust gases as well as the quantity of air. Such arrangement is adapted to properly regulate the return of the exhaust gases and insure an adequate supply thereof in relation to the proportions of the fresh fuel and air under varying conditions of engine operation.

In systems where the usual carburetor is dispensed with, the incoming air may be supplied directly to the engine intake manifold through a suitable air supply conduit communicating with the manifold. In such event the exhaust gases will be introduced into the air conduit under the flow of air therethrough, and the fresh fuel admixed with the air and exhaust gases either in the intake manifold or the engine cylinders, depending on the form and arrangement of fuel pump or other fuel supply means employed in conjunction with the engine.

In conjunction with such arrangement further arrangement is provided in the system to eliminate, or at least greatly minimize adverse effects tending to diminish the return of exhaust gases in proper quantity. To this end use may be made in the improved system in some embodiments of an improved form of centrifuge forming the subject-matter of copending application, Serial No. 414,871, filed October 13, 1941, of George L. Pratt.

In an engine operating on gasoline or other liquid fuel it is desirable to restrict the quantity of fresh fuel entering into admixture with the exhaust gases and air to the point necessary to provide an efficient operating charge, and at the same time to accomplish this result without creating a danger of an erratic fresh fuel supply due to clogging of the fuel control parts through foreign matter. It is further proposed for this purpose to admix the liquid fuel with an auxiliary supply of fluid compatible with the charge to be formed, preferably air, and to control the quantity of such mixture entering into admixture with the main air and exhaust gases through the use of a metering port, or orifice, of sufficient size to insure a reliable supply of fresh fuel at all times, and functioning nevertheless to limit the quantity of liquid fuel to the amount necessary by virtue of the introduction through the same port of the auxiliary fluid which can be varied in amount to limit the quantity of fuel with considerable precision. For this purpose, in the cases where the fresh fuel is to be carbureted with the air and exhaust gases before admission of these charge components into the manifold and engine cylinders, use is preferably made in the present charge forming system of the carbureting apparatus forming the subject-matter of copending application Serial No. 414,872, filed October 13, 1941, of George L. Pratt.

The improved system of the present invention will be understood from the following detailed description in conjunction with the attached drawings.

In such drawings:

Fig. 1 is a diagrammatic plan view of one form of charge forming system according to the present invention, the same embodying a carburetor as a part thereof;

Fig. 2 is an elevational view partly in section illustrating certain features of the invention as employed in conjunction with a carburetor;

Fig. 3 is a fragmentary sectional view, greatly enlarged, of a further portion of the system shown in Fig. 1;

Fig. 4 is a schematic view explanatory of the operation of the system of Fig. 1;

Fig. 5 is a vertical section of an improved device for drawing exhaust gases back to the engine under air suction;

Fig. 6 is a transverse section taken on line 6—6 of Fig. 5;

Fig. 7 is a vertical section of a further form of device for returning exhaust gases taken on the line 7—7 of Fig. 8;

Fig. 8 is a transverse section taken on the line 8—8 of Fig. 7;

Fig. 9 is a cross-section taken on line 9—9 of Fig. 7;

Fig. 10 is a vertical section of still another form of device for drawing exhaust gases to the engine; and Fig. 11 is a view looking down from the top of Fig. 10.

Fig. 12 is an enlarged vertical section of the needle valve shown in Fig. 2.

Referring first to Fig. 1, a conventional internal combustion engine is indicated at 10, the same having an intake manifold 11 and an exhaust manifold 12. As in the system shown in Patent 2,147,670, to George L. Pratt, the exhaust pipe 13 which receives the combustion gases discharged through the exhaust manifold 12 conducts the same to a gas centrifuge 14 which serves to effect a partial segregation as between the heavier noncombustible components and the lighter combustible components. A portion of the centrifuged gases together with a portion of the water vapor formed incident to combustion are discharged as waste through outlet 15. The centrifuged combustibly enriched portions of the exhaust gases together with a further portion of the water vapor are conducted back to the engine through a return pipe 16 which connects with an apertured central pipe 17 through which the treated gases are withdrawn from the central area of the centrifuge under the engine suction.

In the system shown in Fig. 1 a carburetor forms the fuel supply means of the charge forming system, and this form of system has been selected to illustrate the invention not only because it is generally employed but because it involves a special problem in maintaining a reliable and sufficiently restricted supply of fresh fuel as above pointed out. Therein the incoming air supply is shown as dependent on the effective engine suction transmitted through the carburetor, although it will be understood that the air may instead be supplied under forced draft. In any case the return of the exhaust gases will be accomplished in dependency on the flow of the incoming air and maintained in proper proportion to the quantity of air.

As best shown in Fig. 2, an air intake conduit 53 connects with or forms a part of the carburetor into which centrally thereof extends the exhaust gas return line 16. Preferably the end of such pipe is provided with a nozzle 59, and acting in conjunction therewith is a venturi 60. Where, as shown, an air cleaner 19 is employed, exhaust gas nozzle 59 may be secured to the air cleaner cap 84. Air enters the cleaner at 54 and after being cleaned passes downwardly through the top end of conduit 53 under the effective engine suction transmitted through the engine intake manifold to the carburetor, and regulated by the throttle valve to vary the flow of air. The air flow past the exhaust gas outlet nozzle results in an effective suction extending back through exhaust return line 16 into the central pipe of the centrifuge 14, and serves to draw exhaust gases from the helical passage of the centrifuge into the pipe 17 and through conduit 16 into a preliminary mixing chamber 61 of conduit 53 wherein it is combined with the air. This suction effect produced by the inrushing air in intensified through the use of the venturi so as to insure return of an adequate supply of treated exhaust gases.

The centrifuge 14 is generally similar in construction to that shown in Pratt Patent 2,147,671, granted February 21, 1939. In such patented construction the central pipe of the centrifuge is provided with radially extending inlet ports of relatively large size through which the centrifuged exhaust gases for reuse are withdrawn into the central pipe for return to the engine. It has been found that in such device at high speeds an adverse suction effect is created in the helical centrifuging passage itself which tends to retard the flow of treated gases into the central pipe so that at times an insufficient quantity of exhaust gases is supplied for admixture into an efficient operating charge with the air and fresh fuel components. To overcome this difficulty in the improved system, use may be made of an improved form of separator forming the subject-matter of copending application Serial No. 414,871, filed October 13, 1941, of George L. Pratt employing a special arrangement of the exhaust gas inlet ports in the central return pipe of the separator.

Such arrangement of the exhaust gas inlet ports in pipe 17, as preferably employed in the present system, is shown in Fig. 3. Instead of extending radially, such ports 31 are inclined circumferentially inwardly, substantially tangentially, in the direction of flow of gases around the pipe. The flow of gases is indicated by the curved arrows. Such arrangement of the inlet ports has been found to diminish a suction effect created by the rapid flow of gases around the outer periphery of the pipe across the inlet mouths of the ports which at high operating speeds has been found sufficient to interfere with the withdrawal of the treated exhaust gases through the ports under the effective engine suction internally of pipe 17. The adverse suction effect is represented by the broken line arrows, and it will be understood that by reason of the high velocity flow of the exhaust gases through the centrifuge under the force of their discharge from the engine such effect might reach sufficient proportions to diminish the flow of exhaust gases back to the engine in proper proportion for admixture with the air and fresh fuel components which together therewith make up the engine operating charge. The inclination of the inlet ports in pipe 17 as shown in Fig. 3, as above stated, minimizes the adverse suction effect created in the helical passage, and in conjunction with the accentuated effective suction at the exhaust gas delivery nozzle 59, resulting from the return of the exhaust gases to the engine under the action of the inrushing air through the venturi surrounding the nozzle, provides a reliable system adapted to insure withdrawal and return of exhaust gases in proper quantity for varying conditions of engine speed and load.

The inlet ports in the central pipe 17 of the centrifuge are of relatively small size (for example about $\frac{3}{32}$ of an inch, more or less, in diameter) and distributed at various points axially and circumferentially of each convolution of the helical centrifuge passage from which exhaust gases are to be withdrawn. By withdrawing the exhaust gases into the central pipe 17 in relatively small streams at a plurality of scattered areas about the inner periphery of the passage there is less tendency for the withdrawal of the gases to create a condition of turbulence which might disturb the partial segregation of the gases into concentric inner and outer zones, respectively containing increased proportions of the lighter combustible gases and increased proportions of the heavier noncombustible gases. As pointed out in prior Pratt Patent 2,147,671, it is desirable that inlet ports be omitted from the central pipe 17 for an initial portion (say one-third) of the helical passageway so that no gases will be withdrawn before they have been centrifuged sufficiently to result in a concentration of the lighter combustible gases in the central area surrounding pipe 17.

It will be observed by reference to Fig. 2 that the admixture of the exhaust gases with the air preferably occurs on the air intake side of both the main throttle valve 51, and choke or air control valve 52 of the carburetor, where such form of fuel supplying device is employed, so as to be subject to the control of both of said valves. It will be evident that the proportion of exhaust gases is thereby controlled at all times in relation to the quantity of air so that an approximate balance is automatically effected between these two components of the charge. When the engine is running at low speed with the throttle valve only slightly open, the effective suction in the carburetor diminishes to draw in less air through conduit 53, and since the withdrawal and return of exhaust gases from the centrifuge is dependent on the accentuated suction at nozzle 59 by the rush of air in through venturi 60, the flow of exhaust gases is properly restricted. Again, when operating at high engine speeds with the throttle valve well open, the accentuated suction created by the inrushing air through the venturi at nozzle 59 and through line 16 increases so that the exhaust gases are withdrawn from the centrifuge in greater proportion according to the increased flow of the incoming air.

A valve 20 may be located in line 16 for manually regulating the volume of exhaust gases returned to the carburetor, and such valve may be entirely closed to render the exhaust return system inoperative and permit the engine to be run entirely on fresh fuel and air in the usual manner.

It should be pointed out that the venturi 60 is an important feature of the system. Tests have indicated that the flow of incoming air, at least where dependent on engine suction, acts on the exhaust return line at varying speeds with insufficient suction to draw the exhaust gases from the centrifuge in volume as great as may be utilized and regulate the proportion thereof to the fresh fuel and air components as accurately as desired in the absence of the venturi.

In sime cases it is found that the air intake conduit 53 as shown in Fig. 2, particularly as embodied in certain types of air cleaners, is of such small diameter that the provision therein of the venturi 60 cooperating with the exhaust gas return nozzle 59 so reduces the area as to unduly restrict the flow of the incoming air. In order to avoid such objection, and at the same time secure adequate effective suction to draw back the exhaust gases, a modified form of venturi and nozzle may be employed utilizing a venturi of relatively large internal diameter and a special form of nozzle having a relatively extended surface dimension in relation to its cross sectional area of opening. A preferred form of such arrangement is shown in Figs. 5 and 6. A fragmentary portion of the air intake conduit is indicated at 80, the same in many cases constituting a part of an air cleaner. Mounted therein is a venturi 81 of relatively large internal diameter to accommodate the required flow of air demanded by the carburetor. With such an arrangement an exhaust gas return nozzle 59 of small circular cross section such as shown in Fig. 2 would not be subjected to sufficient suction by the incoming air to draw an adequate quantity of exhaust gases back through line 16 because the circumferential dimension of the wall defining the nozzle opening is so small in relation to the cross-section of the surrounding air passage at the restriction point of the venturi as to be subjected to the suction effect of only a small annular zone of the flowing air. In order to increase the effective suction of the flowing air a modified form of nozzle 83 may be employed having a sufficiently small cross sectional area as not to unduly limit the flow of the required volume of air through the venturi, but at the same time having an extended wall surface in peripheral outline so that the small total area of opening will be extended in linear dimension and subjected to the suction effect of a considerable area of the air flowing through the venturi around the nozzle. In this form as best seen in Fig. 6 the nozzle 83 is shaped to provide a series of radially extending hollow ribs 85 at the outlet end of the nozzle, each forming a relatively narrow opening. In the embodiment shown four of such ribs are arranged in the form of a cross, but it will be understood that the cross sectional shape of the nozzle is subject to variation within the principles of the invention to provide a series of nozzle outlet portions of small individual cross section and extended linear arrangement which collectively constitute an outlet opening of suitable size in relation to the diameter of the restricted portion of the Venturi throat.

Where the air cleaner employed is of such construction as to be unsuitable to receive a venturi and the exhaust gas nozzle, and in cases where an air cleaner is not employed in connection with the air intake conduit, a special separate short air intake conduit section formed with a venturi may be provided. In Figs. 7 and 8 is shown such a venturi air intake conduit section 86 having an outlet portion 87 adapted in this instance to fit the air intake end of the carburetor proper. The opposite end 88 of conduit section 86 may be so formed as to be connected with an air cleaner, although the invention operates independently of such a device and permits the same to be dispensed with entirely. The exhaust gas nozzle in this arrangement of the invention may be according to the forms in Figs. 2 or 5, or as shown in Figs. 7 and 8 may consist of a tubular member 89 extending transversely of the restricted portion 90 of the Venturi throat and mounted in suitable openings 92 and 93 formed in member 86. The nozzle element 89 will preferably be formed with a tapering cross section as shown in Fig. 9 to provide a relatively narrow exhaust gas outlet 91. The outer end portion 94 of the nozzle element 89 may be threaded for connection through a suitable joint with the exhaust gas return line 16.

Still another form of exhaust gas nozzle and venturi is shown in Figs. 10 and 11. Therein an air intake conduit section 95 is formed with a suitable venturi having a restricted throat portion 96. Instead of providing a separate exhaust gas nozzle element disposed within the Venturi throat, the nozzle is provided by forming an annular chamber 97 in member 95 which communicates with the narrow throat portion 96 of the venturi by a series of circumferentially arranged small bores 98 through which exhaust gases are drawn into the throat under the suction effect of the flowing air. In the embodiment shown the chamber 97 is closed by a tubular sleeve 99 provided with a threaded inlet element 100 for connection with the exhaust return line 16.

It will be understood that while the form and arrangement of the exhaust gas return nozzle may be varied as indicated by the various embodiments hereinabove described, the purpose and operating principle is the same. An increased effective suction is developed by the inflowing air at a venturi in an air intake conduit acting on a nozzle to return exhaust gases through line 16 from the centrifuging device 14 in varying amounts to maintain a proper balance in proportions between the exhaust gases and air, and the fresh fuel, under variations in the engine demand with changes in speed and load to provide a suitable combustible admixture of these ingredients as the engine operating charge.

It will also be understood that the feature of returning the exhaust gases for use in the engine charge under control of the inflowing air preliminarily to admixture of the air with the fresh fuel charge component is not limited to engines wherein a carburetor is employed to supply the fresh fuel and admix the same with the exhaust gases and air preliminary to passage of the latter components into the engine intake manifold. It will be obvious that the exhaust return nozzle and the Venturi air throat, according to any of the forms thereof illustrated in Figs. 2, 5, 7 and 10, and modifications thereof, may be employed in association with an air intake conduit which communicates directly with the engine intake manifold in cases where fuel injecting pumps are employed to inject the fuel directly into the manifold or the engine cylinders.

Referring again to the system illustrated in Fig. 1 wherein the fresh fuel is supplied through a carburetor to which the air and treated exhaust gases are fed, the liquid hydrocarbon fuel enters the carburetor through line 42 and passes into the usual fuel reservoir 41 from whence it passes into the high speed nozzle 47 for admixture with the previously combined exhaust gas and air components under the suction produced at the outlet end of the fuel nozzle by the flow of such gases through the carburetor. In order to avoid the use of an extremely minute metering orifice for the liquid fuel as would otherwise be required because of the supplementing of the liquid fuel by combustible fuel values of the exhaust gases and consequential lessening in the quantity of liquid fuel required, use is made in the present charge forming system of metering mechanism as disclosed in copending application Serial No. 414,872, filed October 13, 1941, of George L. Pratt according to which a metering orifice of relatively large size is employed. Such orifice will be of sufficient size to be free from clogging difficulties and too large to restrict by itself the flow of gasoline or other fresh fuel to the quantity proper for an efficient engine charge when supplemented by the fuel values of the exhaust gases. Means is provided to limit the flow of liquid fuel through the oversize orifice to the quantity necessary for forming a highly combustible charge with the exhaust gas and air components by introducing through the orifice means adjacent the metering point together with the liquid fuel a supplementary non-fuel fluid, preferably air. Such fluid will dilute the fuel so that the volumetric flow of fuel through the orifice will be less than the cross sectional area of the orifice would otherwise permit by an amount dependent on the ratio of fuel and fluid. Such an arrangement is illustrated in Fig. 2 where the same takes the form of a metering device of the needle valve type. Such type of metering device is preferable because it enables the effective size of the metering orifice to be adjusted and therefore enables a more accurate control to be obtained. A metering plug 62 is provided having therethrough a bore 64 which is enlarged into a conical valve seat at its upper end. Such plug is preferably mounted in the carburetor liquid fuel reservoir 41 in such position as to be always submerged by the fuel. Coacting with the valve seat in the plug is the tapered end of a needle valve 66 shown in detail in Fig. 12 having a hollow stem forming a passage 69 through which an auxiliary air supply is delivered from a cross bore forming an inlet port 71 and located in the upper part of the needle valve exteriorly of the carburetor. Port 71 is controlled by a small needle valve 74 adjustable through head 77 which permits air in any desired quantity to be drawn through the tapered lower end of the needle valve into the inlet end of bore 64 of metering plug 62. The size of the annular metering orifice may be varied by turning the needle valve through its enlarged head 72.

With such arrangement the needle valve may be adjusted to make the effective metering orifice of a sufficiently large size to permit satisfactory flow therethrough without clogging by foreign matter, while the liquid fuel passing through the orifice is restricted, by regulating the auxiliary quantity of air supplied through the needle valve stem 66, to an amount such as otherwise, because of lower demand therefor resulting from the use of treated exhaust gases as a charge component, would necessitate the employment of an orifice so small as to be extremely susceptible to clogging. By this arrangement of admitting air into admixture with the liquid fuel at the submerged metering point, the proportions of such air and liquid fuel will increase and decrease in direct proportion to each other as the effective suction in the carburetor conduit at the outlet end of the high speed nozzle 47 varies with the flow of exhaust gases and air, which flow in the particular system illustrated depends on the effective engine suction acting in the carburetor under regulation of the throttle valve. It will thus be evident that the various charge components, including the main air supply, the exhaust gases, the liquid fuel supply, and the auxiliary air supply, are maintained in proper balance to each other.

The functioning of the charge forming system of Figs. 1 and 2 will be made entirely clear by reference to Fig. 4. As shown in such view, and as just pointed out, the quantity of exhaust gases withdrawn from the centrifuge for reuse is responsive to the suction developed by the flow of the incoming main air supply which in turn depends upon the effective engine suction acting in the carburetor. The same suction regulates the flow of liquid fuel and the auxiliary air supply through the metering orifice so as to properly limit the quantity of fresh fuel in relation to the quantity of exhaust gases, and further serves to vary the quantity of the preliminary admixture of the liquid fuel and auxiliary air through the flow of the preliminarily admixed exhaust gases and air from the main supply past the outlet end of the high speed fuel nozzle. The complete charge is therefore formed in the main mixing chamber of the carburetor, and the control of the quantities of all of the components of the charge are subject to regulation by the main throttle valve of the carburetor which varies the effective suction of the engine acting in the carburetor in accordance with variations in the speed and load of the engine.

I am aware that various proposals have been made for introducing exhaust gases, in the state in which they are discharged from the engine and usually under the pressure of their discharge, into the carburetor. In such prior devices the exhaust gases were utilized without preliminary treatment to alter their composition for their available heat to promote vaporization of the liquid fuel, and/or through their delivery under pressure into the carburetor to aid in the delivery of air or liquid fuel. By reason of the condition in which the exhaust gases were returned they could not be used in any appreciable amount, nor could they function as a combustible fuel component of the charge. In said prior devices consequently, and contrary to the present invention, the careful proportioning of the exhaust gases to the fresh fuel and air was not necessary. Similarly, the provision of means for restricting the fresh fuel to any appreciable extent was not a problem since the exhaust gases in the form and quantity returned could not function as a fuel component and effect a saving in the fresh fuel consumption.

The charge forming system of the present invention has herein been explained in connection with preferred embodiments thereof illustrated in the drawings, but as previously mentioned it will be evident that the principles thereof may be carried out through the employment of parts other than herein disclosed. The scope of the invention is therefore to be determined according to the scope of the appended claims.

I claim:

1. A charge forming system for an internal combustion engine including means for centrifuging the engine exhaust gases, a carburetor having an air intake conduit, suction responsive means responsive to the rate of flow of air in the air intake conduit for delivering a portion of the centrifuged exhaust gases from the centrifuging means into the air intake conduit of the carburetor for admixture with the flow of air, means in the carburetor for carbureting the mixed exhaust gases and air with fresh fuel, and means for delivering the resulting mixed charge to the engine.

2. A charge forming system for an internal combustion engine including an air intake conduit supplying at least the main quantity of air for the charge, means for centrifuging the engine exhaust gases, means for delivering portions of the centrifuged exhaust gases from the centrifuging means to the air intake conduit, a common control valve for regulating the quantities of air and centrifuged exhaust gases, said valve being located at a point beyond the point of admission and admixture of the exhaust gas and air components, means supplying fresh fuel, and means for delivering the air, centrifuged exhaust gases and the fresh fuel to the engine.

3. A charge forming system for an internal combustion engine including means for centrifuging the engine exhaust gases, an air intake conduit supplying at least the main quantity of air for the engine charge, suction responsive means operative in response to the suction effect of air flowing through the conduit to withdraw portions of the centrifuged exhaust gases from the centrifuging means and deliver the same into the air intake conduit for admixture with the air, means for delivering the resulting mixed exhaust gases and air to the engine, and means delivering fresh fuel for formation into the engine charge with the exhaust gases and air.

4. A charge forming system for an internal combustion engine including means for centrifuging the engine exhaust gases, an air intake conduit, means subject to the flow of air through the conduit for withdrawing portions of the centrifuged exhaust gases from the centrifuging means and delivering the same into the conduit into admixture with the air, means for carbureting the mixed exhaust gases and air with fresh fuel, means for delivering the resulting mixed charge to the engine, and a common control valve for regulating the quantity of exhaust gases withdrawn from the centrifuging means and the quantities of air and fresh fuel to be admixed therewith, said valve being located on the delivery side of the point at which the exhaust gases and air are carbureted with the fresh fuel.

5. A charge forming system for an internal combustion engine including means for centrifuging the engine exhaust gases, a carburetor having an air intake conduit supplying at least the main quantity of air for the charge, a conduit terminating in a nozzle located in the carburetor air intake conduit and responsive to the flow of air through said intake conduit to withdraw centrifuged portions of the exhaust gases from the centrifuging means and delivering said gases to said air intake conduit for admixture therein with incoming air, a venturi in the carburetor air intake conduit surrounding the exhaust gas delivery nozzle, means in the carburetor for carbureting the mixed exhaust gases and air with fresh fuel, and means for delivering the mixed charge to the engine.

6. A charge forming system for an internal combustion engine including a centrifuge having a helical passage through which engine exhaust gases are delivered for centrifuging, a carburetor having an air intake conduit, and having fresh fuel injecting means located beyond the air intake conduit, an exhaust gas return conduit having an inlet end extending into the centrifuge centrally thereof and provided with apertures communicating with convolutions of the helical passage, and said exhaust return conduit having an outlet end located in the air intake conduit of the carburetor thereby to withdraw the centrifuged portions of the exhaust gases from the centrifuge passage and deliver the same to the carburetor air intake conduit for admixture therein with air, and means for delivering the charge formed in the carburetor to the engine.

7. A charge forming system for an internal combustion engine including a centrifuge having a helical passage through which engine exhaust gases are delivered for centrifuging, a carburetor having an air intake conduit, and having liquid fuel injecting means located beyond the air intake conduit, an exhaust gas return conduit, an inlet pipe communicating with said conduit extending centrally of the centrifuge having apertures communicating with the inner periphery of convolutions of the helical passage for delivering centrifuged portions of the exhaust gases to the exhaust return conduit, a nozzle at the outlet end of the exhaust return conduit located in the carburetor air intake conduit, a venturi in the carburetor air intake conduit surrounding the exhaust gas delivery nozzle, means for carbureting the incoming air in admixture with the exhaust gases delivered by the nozzle with fresh fuel, and means for delivering the mixed charge from the carburetor to the engine.

8. A charge forming system for an internal combustion engine including a centrifuge receiving the engine exhaust gases, a carburetor having air intake means supplying at least the main quantity of air for the charge and fuel injecting means, a conduit delivering centrifuged exhaust gases from the centrifuge interiorly of the carburetor in varying quantity dependent on variations in the effective suction in the carburetor for admixture into a charge with air and liquid fuel, conduit means for conducting the carburetor charge to the engine and transmitting a suction to the carburetor from the engine, and a throttle valve for regulating the effective suction transmitted to the carburetor.

9. A charge forming system for an internal combustion engine including a centrifuge receiving the engine exhaust gases, a down draft carburetor connecting with the engine and subject to the engine intake suction including fuel injecting means and having an air intake conduit located above the fuel injecting means, and a conduit subject to the suction in the carburetor for delivering centrifuged portions of exhaust gases from the centrifuge to the carburetor air intake conduit.

10. A charge forming system for an internal combustion engine including a centrifuge receiving the engine exhaust gases, a carburetor connecting with the engine and subject to the engine intake suction having fuel injecting means, an air filter delivering air into the carburetor, and a conduit delivering centrifuged portions of the exhaust gases from the centrifuge to the air filter.

11. In a charge forming system for an internal combustion engine including a centrifuge receiving the engine exhaust gases, an air filter delivering air for the engine charge, a venturi in the air filter through which air is delivered, an exhaust gas delivery nozzle located in the air filter at the venturi, a conduit delivering centrifuged portions of the exhaust gases from the centrifuge to said nozzle.

12. In combination with an internal combustion engine, a carburetor having fuel injecting means and air intake means, means for centrifuging the exhaust gases discharged from the engine, means for removing waste portions of the centrifuged exhaust gases, and means responsive to suction within the carburetor for recovering other centrifuged portions of the exhaust gases from the centrifuging means and delivering the same into the carburetor for admixture with the air and fuel into a charge for the engine.

13. In combination with an internal combustion engine, a carburetor having fuel injecting means and air intake means, a conduit for delivering the charge formed in the carburetor to the engine, an exhaust conduit receiving the combustion gases discharged by the engine, a centrifuge having a helical passageway therethrough and connecting at one end with the exhaust conduit, an outlet for discharging portions of the centrifuged combustion gases from the other end of the centrifuge passageway, a return conduit having an apertured inlet end extending centrally of the centrifuge and communicating with the inner periphery of convolutions of the passageway for withdrawing portions of the centrifuged exhaust gases from the passageway, and an outlet end on said return conduit delivering said centrifuged exhaust gases into the carburetor.

14. In a charge forming system for an internal combustion engine including a centrifuge having therein a helical centrifuging passage receiving the engine exhaust gases at one end and having an outlet at the other end for discharging portions of the centrifuged exhaust gases, an air intake conduit, an exhaust gas return conduit delivering interiorly of the air conduit and subject to the effective suction therein, and an inlet end portion on said conduit extending centrally of the centrifuge and having a multiplicity of fine openings therein disposed at a multiplicity of points both lengthwise and circumferentially thereof for withdrawing centrifuged portions of the exhaust gases from various circumferential areas of each of a plurality of convolutions of the helical centrifuged passage into the return conduit under the effective suction existing in the air conduit.

15. In a charge forming system for an internal combustion engine including a centrifuge having therein a helical centrifuging passage receiving the engine exhaust gases at one end and having an outlet at the other end for discharging portions of the centrifuged exhaust gases, an air intake conduit, an exhaust gas return conduit delivering interiorly of the air conduit and subject to the effective suction therein, and an inlet end portion on said conduit extending centrally of the centrifuge and having ports through the wall thereof communicating with convolutions of the helical centrifuge passage and inclining inwardly circumferentially in the forward direction of flow of gases around the passage for withdrawing exhaust gases into the return conduit under the effective suction existing in the air conduit.

16. A charge forming system for an internal combustion engine including means for centrifuging the engine exhaust gases, means for admixing portions of the centrifuged exhaust gases with a main supply of air, means for admixing fresh fuel with a supplementary supply of air, means for carbureting the mixed exhaust gases and main supply of air with said mixed fresh fuel and supplementary supply of air, and means for delivering the resulting mixed charge to the engine.

17. A charge forming system for an internal combustion engine including means for centrifuging the engine exhaust gases, means for admixing portions of the centrifuged exhaust gases with a main supply of air, means for admixing and metering liquid fuel with a supplementary supply of air, means for carbureting the mixed exhaust gases and main supply of air with said mixed liquid fuel and supplementary supply of air, and means for delivering the resulting mixed charge to the engine.

18. A charge forming system for an internal combustion engine including a centrifuge receiving the engine exhaust gases, a carburetor having an air intake and liquid fuel injecting means, a conduit delivering centrifuged combustible portions of the exhaust gases from the centrifuge into the carburetor for formation into a charge with liquid fuel and air, a source of liquid fuel, metering means through which liquid fuel from said supply is conducted to the fuel injecting means, said metering means having a metering opening capable of delivering to the injecting means for admixture with the air and exhaust gases a quantity of fuel greater than desired in the mixed charge, and means for delivering air through said metering opening together with the liquid fuel so as to restrict the liquid fuel delivered through the fuel injecting means to the quantity desired in the mixed charge.

19. A charge forming system for an internal combustion engine including a centrifuge having a helical centrifuging passage receiving the exhaust gases from the engine, a carburetor connecting with the engine and subject to the engine intake suction having fuel injecting means and an air intake, a conduit having an inlet end extending centrally of the centrifuge and having an outlet end delivering into the carburetor and subject to the effective suction in the carburetor, said conduit inlet end having ports through the wall thereof communicating with convolutions of the helical passage and extending at an inclination inwardly in the forward direction of flow of gases around the helical passage, said ports providing for the withdrawal of centrifuged portions of the exhaust gases from the inner portion of the centrifuge passage into the conduit for delivery to the carburetor under the effective suction in the carburetor, a liquid fuel supply delivering to the fuel injecting means in the carburetor, metering means controlling the quantity of fuel delivered from the said supply to the fuel injecting means, said metering means having a metering opening capable of delivering liquid fuel to the fuel injecting means in greater quantity than suitable to form a charge with the air and exhaust gases of suitable proportions, and means for delivering air through the metering opening together with the liquid fuel so as to restrict the liquid fuel delivered to the fuel injecting means to the quantity required for admixture with the exhaust gases and air into a suitable operating charge for the engine.

20. A charge forming system for an internal combustion engine comprising a fuel supply line, a line supplying exhaust gases discharged from the engine, a charge forming device having an air intake port and a charge outlet delivering to the engine, means connecting with said first line for delivering vaporized liquid fuel into the charge forming device, a Venturi throat in the charge forming device providing communication between the air inlet and charge outlet, and nozzle means connecting with the second line and opening into the Venturi throat delivering exhaust gases into the charge forming device for admixture into a charge with the air and fuel.

21. In a charge forming system for an internal combustion engine comprising a fresh fuel supply line, a line supplying exhaust gases discharged from the engine, a mixing device having an air intake port and an outlet delivering to the engine, a Venturi throat in the charge forming device providing communication between the air inlet and outlet, a non-cylindrical nozzle connecting with the second line located and opening in the Venturi throat for delivering exhaust gases into the mixing device for admixture with the air, said nozzle being relatively wide in at least one direction transversely of the Venturi throat but having a cross-sectional area substantially less than that of a cylindrical nozzle having a diameter equal to the width of the non-cylindrical nozzle, whereby the nozzle has portions widely distributed transversely of the Venturi throat without a cross-sectional area such as to unduly restrict the area of opening of the Venturi throat to the flow of gases outside the nozzle, and means connecting with the first line for delivering fresh fuel into admixture with the air and exhaust gases.

22. A charge forming system for an internal combustion engine comprising a fresh supply line, a line supplying exhaust gases discharged from the engine, a mixing device having an air intake port and an outlet delivering to the engine, a Venturi throat in the charge forming device providing communication between the air inlet and the outlet, a nozzle connecting with the second line and located and opening in the Venturi throat for delivering exhaust gases into the mixing device for admixture with the air, said nozzle being formed with a plurality of narrow radially extending hollow vanes opening into different circumferential areas of the Venturi throat, and means connecting with the first line for delivering fresh fuel for admixture with the air and exhaust gases.

23. A charge forming system for an internal combustion engine comprising a fresh fuel supply line, a line supplying exhaust gases discharged from the engine, a mixing device having an air intake port and an outlet delivering to the engine, a Venturi throat in the mixing device providing communication between the air inlet and the outlet, a nozzle member connecting with the second line extending transversely of the Venturi throat having an elongated opening extending lengthwise thereof for delivering exhaust gases into the mixing device for admixture with the air, and means connecting with the first line for delivering fresh fuel for admixture with the air and exhaust gases.

24. A charge forming system for an internal combustion engine comprising a fresh fuel supply line, a line supplying exhaust gases discharged from the engine, a mixing device having an air intake port and an outlet delivering to the engine, a Venturi throat in the mixing device providing communication between the air inlet and the outlet, a chamber surrounding the wall of the Venturi throat connecting with the exhaust gas line, a series of nozzle openings distributed circumferentially of said wall delivering exhaust gases from said chamber into the Venturi throat for admixture with the air, and means connecting with the first line for delivering fresh fuel for admixture with the air and exhaust gases.

25. A charge forming system for an internal combustion engine including intake means supplying air for the engine charge, means for centrifuging the engine exhaust gases, means responsive to the rate of flow of air supplied through said intake means for introducing varying portions of centrifuged exhaust gases into admixture with said air, and injection means for delivering fresh fuel into the mixed air and exhaust gases.

26. A charge forming system for an internal combustion engine including means for centrifuging the engine exhaust gases, an air intake conduit supplying at least the main quantity of air for the charge, a conduit terminating in a nozzle located in the air intake conduit and operable in response to the suction effect on said nozzle of the flow of air through said air intake conduit to withdraw centrifuged portions of the exhaust gases through the centrifuging means and deliver said gases from said nozzle for admixture with the air, a Venturi air passage at the exhaust gas delivery nozzle for accentuating the suction effect of the air flow on the nozzle, means for delivering the mixed charge of air and exhaust gases to the engine, and means delivering fresh fuel to form a charge with the air and exhaust gases.

GEORGE L. PRATT.